Sept. 17, 1957 W. O. BACKMAN 2,806,411
HOLD-DOWN UNIT FOR CLAMPING DEVICES
Filed Aug. 31, 1956 2 Sheets-Sheet 1

INVENTOR
WILLIAM O. BACKMAN
BY Munn & Liddy
ATTORNEYS

Sept. 17, 1957 W. O. BACKMAN 2,806,411
HOLD-DOWN UNIT FOR CLAMPING DEVICES
Filed Aug. 31, 1956 2 Sheets-Sheet 2
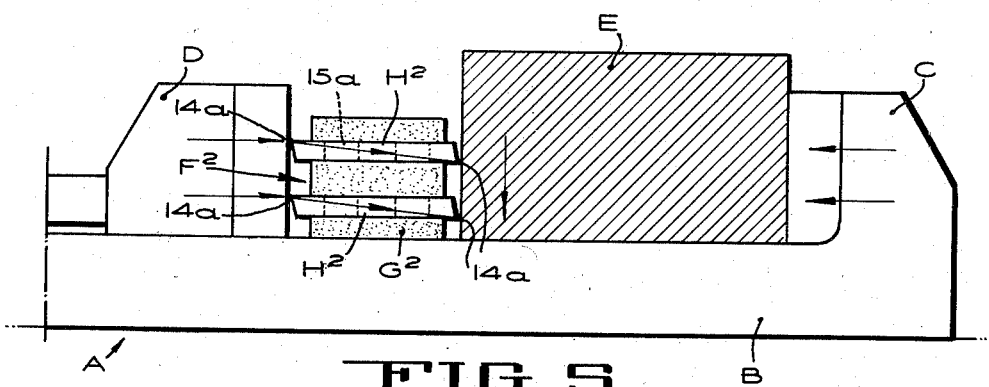
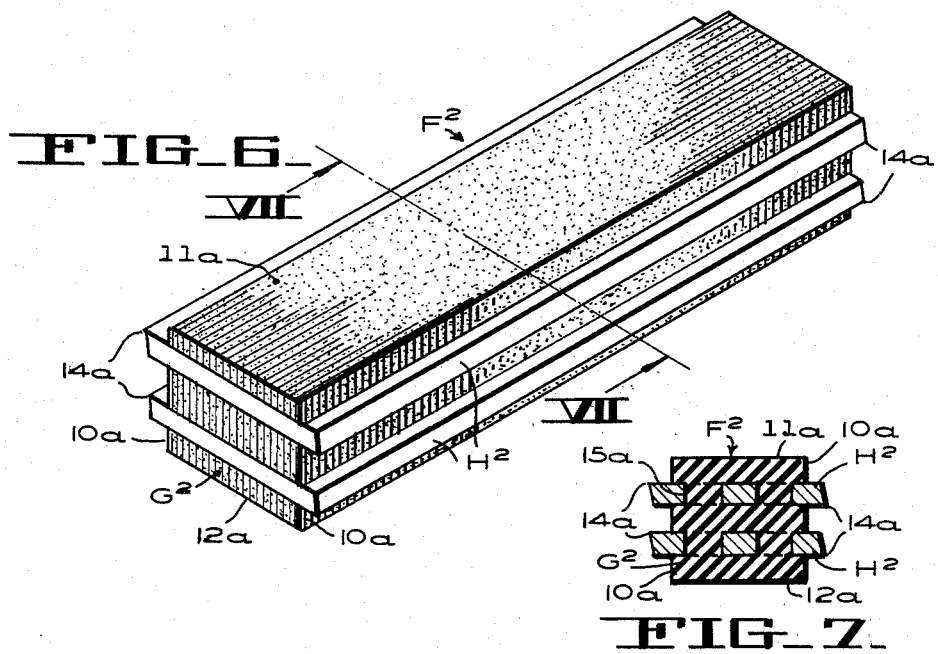
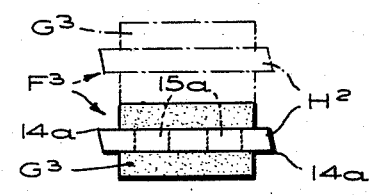
INVENTOR
WILLIAM O. BACKMAN
BY Munn & Liddy
ATTORNEYS

United States Patent Office 2,806,411
Patented Sept. 17, 1957

2,806,411

HOLD-DOWN UNIT FOR CLAMPING DEVICES

William O. Backman, Fair Oaks, Calif.

Application August 31, 1956, Serial No. 607,448

4 Claims. (Cl. 90—59)

The present invention relates to improvements in a hold-down unit for clamping devices. The unit is to be used in conjunction with existing material-holding fixtures, such as vises of shapers and milling machines. It is especially useful in those jogs where the work is to be machined with parallel top and bottom surfaces.

It is a well known fact that the customary vise has a drawback in that the movable jaw has a tendency to rise from the base, when tightened upon the workpiece. In turn, this tilts the workpiece so that the top is not machined parallel to the bottom.

Accordingly, it is proposed in this invention to provide an improved hold-down unit, which will actually force the workpiece downwardly against the supporting base of the vise, when the jaws of the latter are moved to clamp the workpiece in place.

More specifically stated, I provide a hold-down unit for use with jaws of a clamping device, which is adapted for forcing a workpiece down upon a supporting base of the clamping device. This unit includes a resilient matrix body having a blade embedded therein, the blade projecting beyond the opposite lateral sides of the matrix body. The blade defines longitudinal gripping edges disposed for abutting one of the jaws of the clamp and the workpiece, respectively, and these edges are located so as to result in rocking the blade in a direction to force the workpiece against the base of the clamping device, when the jaws are moved to clamp the workpiece in place, prior to a machining operation.

Other objects and advantages will appear as the specification continues. The novel features will be particularly pointed out in the claims hereunto appended.

*Drawings*

For a better understanding of my invention, reference should be had to the accompanying drawings, forming part of this application, in which:

Figure 5 is a view similar to Figure 1, but disclosing a modified form of my hold-down unit having double blades;

Figure 6 is an isometric view of the hold-down unit shown in Figure 5;

Figure 7 is a transverse sectional view taken along the line VII—VII of Figure 6; and Figure 8 is an end elevational view of a further modification, disclosing a single-bladed hold-down unit.

While I have shown only the preferred forms of my invention, it should be understood that various changes, or modifications, may be made within the scope of the annexed claims without departing from the spirit thereof.

*Detailed description*

Figure 1:
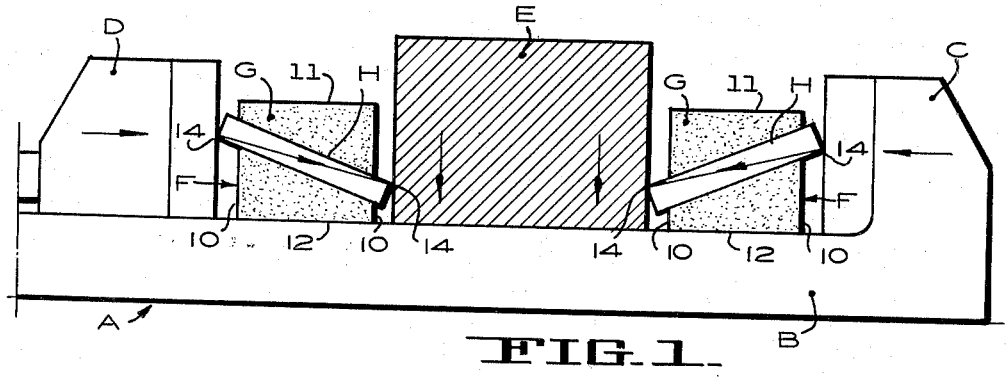
Figure 1 is a side elevational view of a vise having a workpiece clamped thereto by a pair of my hold-down units.

Referring now to Figure 1, a conventional clamping device has been indicated at A, which may form the vise portion of a shaper or milling machine. In its structural features, this clamping device has been disclosed as including a supporting base B, which is provided with a fixed jaw C. It will be noted that a movable jaw D is mounted on the base B for movement toward and away from the fixed jaw by any suitable means.

As shown, a workpiece E has been interposed between the jaws C and D so as to rest on the base B. In Figure 1, there has been illustrated a pair of my hold-down units F, which are identical with each other, with one of these units being ararnged on each lateral side of the workpiece.

Each hold-down unit F includes a resilient matrix body G, which defines opposite lateral sides 10—10 that are adapted to be disposed in confronting relation with one of the jaws C or D and the workpiece E. Moreover, the unit has a blade (or blades) H embedded in the matrix body G, with the latter extending above and below the blade, and the blade projecting beyond the opposite lateral sides 10—10 of the matrix body. As clearly shown, the body G defines parallel top and bottom surfaces 11 and 12, respectively.

In the first embodiment of the invention, as shown in Figures 1 to 4, inclusive, the blade H is disposed on a transverse incline relative to the surfaces 11 and 12. Actually the angle of tilt of the blade has been exaggerated for the purpose of clarity; and, in any event the tilt should be sufficient to create a fulcrum effect upon tightening the clamping jaws. The blade defines a parallelogram in cross-section, herein shown as a rectangle. In its structural features, the blade has a pair of longitudinal gripping edges 14—14, which are arranged at diagonally-opposite corners of the parallelogram, and disposed for abutting one of the jaws (C or D) and the workpiece E, respectively.

The blade H is resiliently supported by the matrix body G, and the longitudinal gripping edges 14—14 are located so as to result in rocking the blade in a direction to urge the workpiece E downwardly against the supporting base B of the clamping device A, when the movable jaw D is actuated to clamp the workpiece in place.

Figure 3:
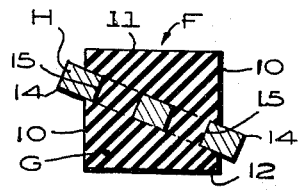
Figure 3 is a transverse sectional view taken along the line III—III of Figure 2.
Figure 2:
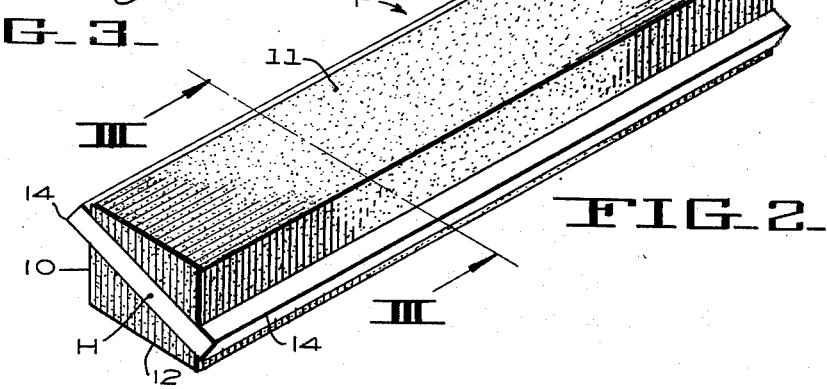
Figure 2 is an isometric view of one embodiment of the hold-down unit.
Figure 4:
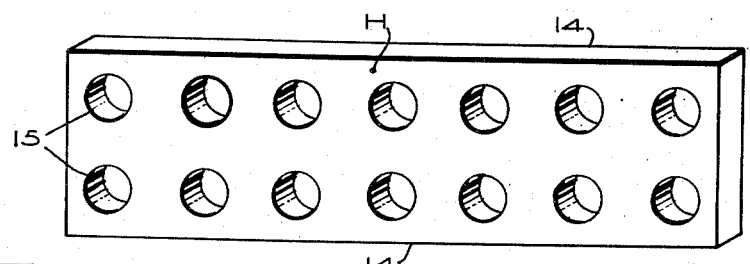
Figure 4 is an oblique view of the blade illustrated in Figures 1 to 3, inclusive.

With particular reference to Figures 3 and 4, it will be observed that the blade H is fashioned with a plurality of openings 15 therein, through which the material of the matrix body G extends, thereby anchoring the blade to the matrix body.

By way of example the pliable body G may be molded from any suitable natural or synthetic products, such as rubber, which in cast form have the resiliency and pliability approximating that found in automobile tires. Such products can be poured into a mold in which the blade H is supported. Obviously, these products will flow through the openings 15 so that the matrix body G will extend above and below the blade H. The blade itself may be made of metal having the proper degree of hardness so as to reduce wear thereof.

In the second embodiment of the invention, as shown in Figures 5, 6 and 7, I have illustrated a modified hold-down unit F², which for the purpose of disclosure only, has been provided with a pair of blades H². These blades are disposed parallel with the top and bottom surfaces 11a and 12a, respectively, of the resilient matrix body G², and both extend beyond the opposite lateral sides 10a—10a of the matrix body. The blades H² are fashioned with openings 15a through which the material of the matrix body G² extends. Obviously, a single blade could be used.

Moreover, each of the blades H² defines a parallelogram in cross-section, and in this case a rhomboid is provided. Thus, each of these blades has a pair of longitudinal gripping edges 14a—14a, which are arranged at diagonally opposite corners of the parallelogram so as to abut the jaw D and the workpiece E, respectively. The same clamping device A has been shown in Figure 5 as that disclosed in Figure 1; accordingly, like reference characters have been applied to corresponding parts.

The third embodiment of the invention, as illustrated in Figure 8 suggests a hold-down unit F₃, in which the resilient body G³ is provided with a single blade H². The latter is identical with one of the blades shown and described with respect to Figures 5, 6 and 7.

It will be appreciated, of course, that my hold-down units F, F² or F³ may be utilized on both sides of the workpiece E, as suggested in Figure 1, or a single hold-down unit F, F² or F³ may be applied to one side of the workpiece, in the manner disclosed in Figure 5.

There will arise occasions in which it might be necessary to use several of these hold-down units (F, F² or F³), stacked one on top of the other, as suggested in Figure 8, on one or both sides of the workpiece E, for example, where a vertical plate is held in a deep-jawed vise.

From time to time, the longitudinal gripping edges 14 or 14a of the blades may be readily sharpened so as to assume proper gripping with the jaws and workpiece, against which they are applied, during use of the hold-down units.

The fact that the resilient matrix body extends above and below its blade, in all species of the invention, permits the hold-down units to be inverted, when units are placed on opposite sides of the workpiece, as in Figure 1. Also, this arrangement will allow the units to be stacked, as suggested in Figure 8 of the drawing.

I claim:

1. A hold-down unit for use with jaws of a clamping device for holding a workpiece down upon a supporting base of the clamping device, the workpiece being interposed between the jaws, the unit comprising: a resilient matrix body defining lateral sides, which are adapted to be disposed in confronting relation with one of the jaws of the clamping device and the workpiece, respectively; and at least one blade embedded in the matrix body, with the latter extending above and below the blade; the blade projecting beyond the opposite lateral sides of the matrix body, and defining a parallelogram in cross-section; the blade having a pair of longitudinal gripping edges, which are arranged at diagonally-opposite corners of the parallelogram, and disposed for abutting one of the jaws and the workpiece, respectively; the blade being resiliently supported by the matrix body, and said pair of longitudinal edges being located so as to result in rocking the blade in a direction to urge the workpiece downwardly against the supporting base of the clamping device, when the movable jaw is actuated to clamp the workpiece in place.

2. The hold-down unit, as defined in claim 1; and in which the blade is fashioned with openings therein, through which the material of the matrix body extends, thereby anchoring the blade to the matrix body.

3. The hold-down unit, as defined in claim 1; and in which the matrix body defines parallel top and bottom surfaces, and the blade is disposed on a transverse incline relative to these surfaces.

4. The hold-down unit, as defined in claim 1; and in which the matrix body defines parallel top and bottom surfaces, and the blade is disposed parallel with these surfaces.

No references cited.